(12) United States Patent
Tomkinson

(10) Patent No.: US 9,683,642 B2
(45) Date of Patent: Jun. 20, 2017

(54) MECHANISM FOR CONVERTING MOTION

(71) Applicant: Shane Ashley Tomkinson, Timaru (NZ)

(72) Inventor: Shane Ashley Tomkinson, Timaru (NZ)

(*) Notice: Subject to any disclaimer, the term of this patent is extended or adjusted under 35 U.S.C. 154(b) by 0 days.

(21) Appl. No.: 14/989,636

(22) Filed: Jan. 6, 2016

(65) Prior Publication Data

US 2016/0116032 A1    Apr. 28, 2016

Related U.S. Application Data

(63) Continuation of application No. PCT/IB2013/055727, filed on Jul. 12, 2013.

(51) Int. Cl.
| | | |
|---|---|---|
| *F16H 21/00* | (2006.01) | |
| *F16H 25/08* | (2006.01) | |
| *F16H 37/16* | (2006.01) | |
| *F16H 25/12* | (2006.01) | |
| *F04B 9/04* | (2006.01) | |
| *F04B 35/01* | (2006.01) | |

(Continued)

(52) U.S. Cl.
CPC .............. *F16H 25/12* (2013.01); *F01B 3/08* (2013.01); *F04B 9/047* (2013.01); *F04B 35/01* (2013.01); *F16H 25/186* (2013.01); *F16H 37/16* (2013.01)

(58) Field of Classification Search
CPC ........ F16H 25/12; F16H 25/186; F16H 37/16; F16H 25/18; F04B 9/047; F04B 35/01; F01B 3/08
USPC ............... 74/56, 57, 58, 23; 123/43 C, 44 E, 123/43 AA
See application file for complete search history.

(56) References Cited

U.S. PATENT DOCUMENTS 2,352,396 A * 6/1944 Maltby ................. F01B 3/0079
 123/45 A
2,552,350 A * 5/1951 Smith ..................... F16H 25/12
 112/118

(Continued)

FOREIGN PATENT DOCUMENTS

| IT | 0930025 | 5/1995 |
| SU | 1689695 | 11/1991 |
| WO | 2010/064508 | 5/2010 |

OTHER PUBLICATIONS http://www.shepherdengine.com; The Shepherd Engine; May 30, 2013.

(Continued)

*Primary Examiner* — William Kelleher
*Assistant Examiner* — Jake Cook
(74) *Attorney, Agent, or Firm* — Beyer Law Group LLP

(57) ABSTRACT

A mechanism 21 for converting rotating motion to rotating and reciprocating motion and/or vice versa. The mechanism has a housing or support 22, a first member 23 rotatable about a first axis and reciprocable along the first axis, and a second member 2 rotatable about a second axis spaced from the first axis. Rotation of the first member 23 or the second member 25 causes rotation of the other member. A guide 29a, 29b is configured to contact a cam surface 27a, 27b. The cam surface or the guide is provided on the first member 23. The cam and guide are configured to cause the first member 23 to rotate upon movement of the first member along the first axis, or to move along the first axis upon rotation of the first member 23.

14 Claims, 6 Drawing Sheets

(51) Int. Cl.
*F01B 3/08* (2006.01)
*F16H 25/18* (2006.01)

(56) References Cited

U.S. PATENT DOCUMENTS

| | | | | |
|---|---|---|---|---|
| 3,393,570 | A | * | 7/1968 | Whicker ............... F16H 25/186 74/57 |
| 3,396,709 | A | | 8/1968 | Robicheaux |
| 3,403,508 | A | * | 10/1968 | Kelly ..................... F02B 75/26 123/56.8 |
| 3,757,748 | A | | 9/1973 | Arney |
| 4,136,647 | A | * | 1/1979 | Stoler ..................... F02B 75/28 123/45 R |
| 5,218,933 | A | | 6/1993 | Enrlich |
| 5,517,952 | A | | 5/1996 | Wielenga |
| 5,743,220 | A | | 4/1998 | Guarner-Lans |
| 6,343,575 | B1 | * | 2/2002 | Deckard .................. F01B 3/04 123/43 R |

OTHER PUBLICATIONS

KMODDL Devices; May 30, 2013.
Complete Specification for NZ patent 529777; Sep. 20, 2006.
Provisional Specifications for NZ 529777, 530735, and 535351; Sep. 20, 2006.
International Search Report and Written Opinion for PCT/IB2013/055727.
International Preliminary report on Patentability for PCT/IB2013/055727.

* cited by examiner

MECHANISM FOR CONVERTING MOTION

RELATED APPLICATIONS

This application is a continuation of International Application No. PCT/IB2013/055727, filed on Jul. 12, 2013, which is incorporated herein by reference of its entirety.

FIELD OF THE INVENTION

This invention relates to a mechanism for converting rotating motion to rotating and reciprocating motion and/or for converting rotating and reciprocating motion to rotating motion.

BACKGROUND

Mechanisms for converting reciprocating motion to rotating motion or rotating motion to reciprocating motion have been used for many centuries. For example, from the third century AD Hierapolis Sawmill, in which a water wheel was used to power a horizontal reciprocating saw, to the mechanisms that form the modern internal combustion engine.

The most commonly used mechanism for converting between rotational and reciprocating motion is the crank and slider mechanism. Other known mechanisms include the scotch yoke, swash-plate, wobble plate, and the cam and follower.

The simple crank and slider, scotch yoke, swash plate, and wobble plate mechanisms have a number of disadvantages. In particular, in the conversion between rotational and linear motion, the reciprocating length is set for a given mechanism, and the ratio between the input and output is fixed at 1:1 reciprocation to rotation.

In addition, crank and slider mechanisms produce un-balanced motions and require counter-balancing weights to reduce the effects of that un-balanced motion. Scotch yoke mechanisms need larger amounts of material around the yoke for adequate strength. Depending on the application and type of design, some wobble and swash plate parts are prone to fatigue failure and excessive wear. Swash plates that overcome these reliability issues are typically expensive to manufacture. The applications for wobble plates and swash plates are limited due to their high point loading.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a mechanism that addresses or one or more of the above disadvantages and/or that least provides the public with a useful alternative.

SUMMARY OF THE INVENTION

In one aspect, the present invention provides a mechanism for converting rotating motion to rotating and reciprocating motion and/or for converting rotating and reciprocating motion to rotating motion. The mechanism comprises: a housing or support; a first member rotatable relative to the housing or support about a first axis and reciprocable along the first axis relative to the housing or support; and a second member rotatable relative to the housing or support about a second axis that is spaced from the first axis, the second member operatively coupled to the first member such that rotation of one of the members causes rotation of the other of the members. The first member comprises a groove or channel and surfaces of said groove or channel provide two generally opposed cam surfaces, and the second member comprises a projection and sides of said projection provide two generally opposed guide surfaces configured to be in rolling contact with the cam surfaces. The groove or channel comprises gear teeth forming a first gear, and the projection on the second member comprises gear teeth forming a second gear configured to engage the first gear. The cam surfaces and the guide surfaces are configured to cause the first member to rotate upon movement of the first member along the first axis, and/or to cause the first member to move along the first axis upon rotation of the first member.

In an embodiment, each cam surface has a cam profile comprising at least one lobe.

The cam surface may be arranged to support a load applied in a direction substantially parallel to the first axis.

In an embodiment, the cam surfaces, or a tangent of the cam surfaces, forms an angle of between about 30 degrees and about 90 degrees relative to the first axis, preferably between about 45 degrees and about 90 degrees relative to the first axis.

In an embodiment, a gear arrangement couples the first member to the second member. The gear arrangement may comprise a first gear provided on the first member and an engaging second gear provided on the second member. The first and second gears may be spur gears. One of the gears may comprise teeth that are longer than the teeth of the other of the gears. In such an embodiment, the cam surface preferably has a cam profile and the length of the teeth on the first gear or second gear may be at least as long as a maximum amplitude of the cam profile.

Preferably, the cam surfaces are intermediate a first end and an opposite second end of the first member.

In an embodiment, the first and second members are parallel.

In an embodiment, the first and second members are cylindrical.

In an embodiment, the second member is reciprocable along the second axis relative to the housing or support. In that embodiment, a guide may be fixed relative to the support or housing in the direction of the second axis. In such an embodiment, a maximum amplitude of reciprocation of the first member is preferably larger than a maximum amplitude of reciprocation of the second member.

The mechanism may comprise one or more further first member(s) coupled to the second member such that rotation of the first members or the second member causes rotation of the other of the first members or the second member. Alternatively, one or more further second member(s) may be coupled to the first member such that rotation of the first member or the second members causes rotation of the other of the first member or the second members.

The mechanism may be configured to primarily or only convert rotating motion of the second member to rotating and reciprocating motion of the first member. In that embodiment, the mechanism may be incorporated into a compressor or pump for example. Alternatively, the mechanism may be configured to primarily or only convert rotating and reciprocating motion of the first member to rotating motion of the second member. In that embodiment, the mechanism may be incorporated into a hydraulic motor for example.

Alternatively, the mechanism may be configured to both convert rotating motion of the second member to rotating and reciprocating motion of the first member, and rotating and reciprocating motion of the first member to rotating motion of the second member. In that embodiment, the mechanism may be incorporated into an internal combustion engine, for example. In an internal combustion engine, combustion of fuel in the cylinders drives reciprocation of the first member, in turn driving the rotating member. Inertia from a flywheel operatively connected to the rotating member causes the rotating member to continue rotating after the piston has reached the end of its stroke, and in turn drives the reciprocation of the first member in the opposite direction to compress the fuel and air mixture to a suitable compressed ratio before ignition. Any extra energy from this process is the output power of the engine.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

Figure 1:
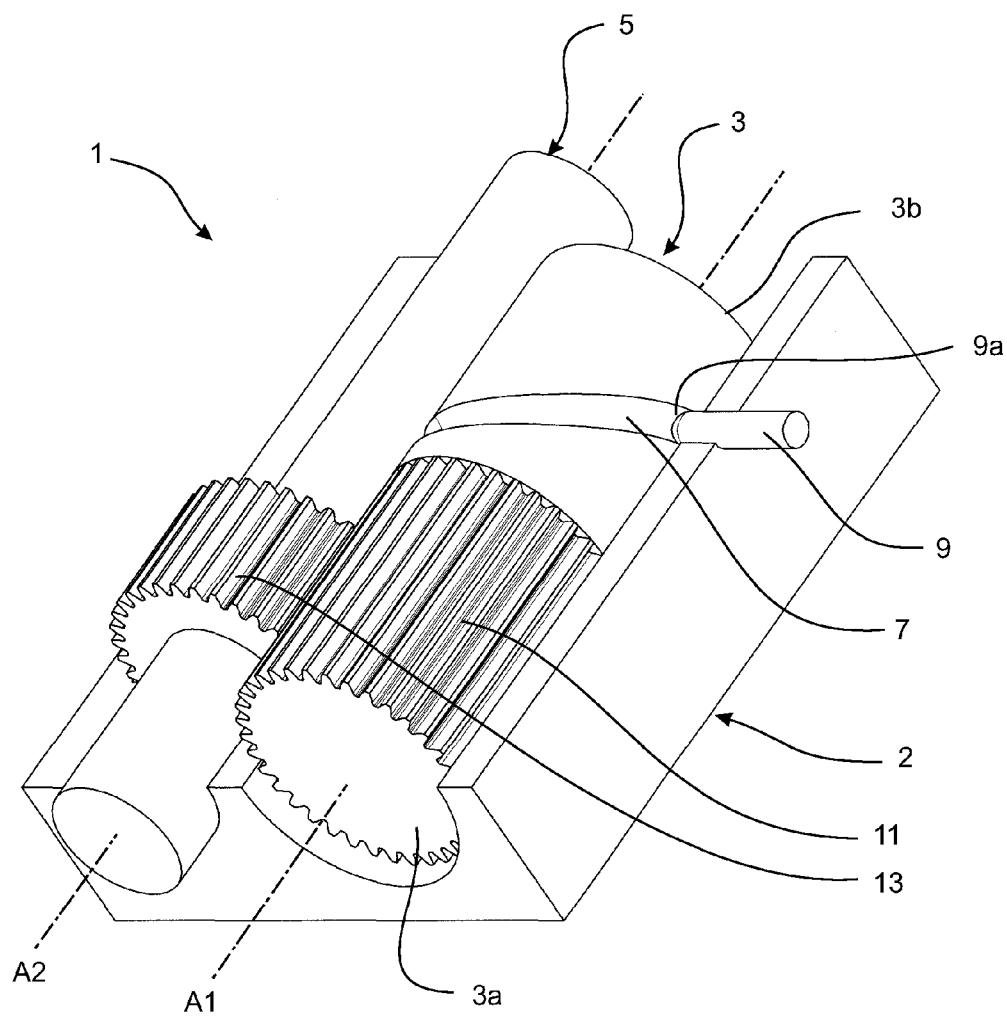
FIG. 1 is a perspective view of a first exemplary embodiment mechanism according to the present invention.

FIGS. 1 to 6 show a first exemplary embodiment mechanism for converting rotational motion to rotating and reciprocating motion and/or for converting rotating and reciprocating motion to rotating motion. The mechanism 1 comprises a housing or support 2, a first member 3 that is rotatable and reciprocable, a second member 5 that is rotatable, and a guide 9. The first member 3 is rotatable relative to the support 2 about a first axis A1 and linearly reciprocable back and forth along the first axis A1, relative to the support 2. The second member 5 is rotatable relative to the support 2 about a second axis A2, and is operatively coupled to the first member 3 to rotate with rotation of the first member 3.

The first and second members 3, 5 are coupled together by a gear arrangement comprising a first gear 11 fixed to or integral with the first member 3, and an engaging second gear 13 fixed to or integral with the second member 5. Preferably the gears 11, 13 are configured such that rotation of one of the first or second member 3, 5 can drive counter-rotation of the other of the first or second member 3, 5.

In the embodiment shown, the first member 3 and second member 5 are parallel shafts and the first and second gears 11, 13 are spur gears concentric with the respective first or second member 3, 5. The teeth of the first gear 11 are elongate in the axial direction of the first axis A1 and are longer than the teeth of the second gear 13 such that the first and second gears 11, 13 will remain in contact for the full reciprocation of the first member 3 along the first axis A1. The elongate teeth of the first gear 11 slide in the axial direction relative to the teeth of the second spur gear 13. The length of the teeth of the first gear 11 in the axial direction is at least as long as the maximum amplitude of the sinuous slot 7.

Alternatively, the teeth of the second gear 13 could be longer in the axial direction than the teeth of the first gear 11. In that embodiment, the teeth on the first gear 11 would protrude from the first member 3 to enable the first gear 11 to be slidable back and forth relative to the elongate second gear 13. In such an embodiment, the housing or support 2 may comprise a recess or other clearance to allow the teeth of the first gear 11 to move freely relative to the housing or support 2 as the first member 3 rotates and reciprocates.

The first and second gears 11, 13 may have the same number of teeth such that the first and second members 3, 5 are coupled for rotation in a 1:1 ratio. Alternatively, the first gear 11 may have a different number of teeth to the second gear 13 to step up or step down the respective rate of rotation. Other coupling arrangements or relative, non-parallel orientations of the first and second members 11, 13 are possible. In some arrangements, the second member may consist of the second gear, and may be geared to a further output or input member.

A cam surface 7 is provided on the first member 3 in a radially-exterior side surface of the first member between a first end 3a and an opposite second end 3b of the first member 3. In the embodiment shown, the first and second members 3, 5 are cylindrical members. The cam surface is provided by a continuous slot 7 that extends around the circumference of the first member 3. The slot profile is sinuous and forms at least one lobe in the longitudinal direction of the first member 3. The slot 7 has a rounded cross section, but alternatively could have an angled profile. The inner surface of the slot provides the cam surface.

In the embodiment of FIGS. 1 to 6, the guide comprises a pin 9 fixed relative to the support 2. The pin 9 has a rounded tip 9a that corresponds to the rounded cross-section of the slot 7. The tip 9a of the pin is positioned in the slot 7 in contact with the cam surface.

In alternative embodiments, the guide 9 and the cam surface 7 may have alternative forms and/or may be provided on other components. For example, the guide 9 could comprise a surface of a projection or a roller, similarly the cam surface 7 could comprise a surface on a projection or shoulder rather than a surface in a slot. The guide 9 could be provided on the second member 5 rather than being provided on the support 2, for example as a surface of the second member 5 in rolling contact with the cam surface 7 on the first member 3. As a further alternative, the cam surface 7 could be provided on the second member 5 or on the support 2, and the first member 3 could comprise the guide 9.

Alternative embodiments of the mechanism may comprise two or more guides 9. For example, two discrete guides 9 may be arranged on opposite sides of a symmetrical cam surface 7 having two lobes.

In the embodiment shown, the support 2 comprises bearing surfaces 15, 17 for rotatably supporting the first and second members 3, 5, respectively. The support 2 also comprises a recess 19 that provides clearance around the second gear 13 to enable it to freely rotate. Alternatively, separate bearings could be provided on the support to enable rotation or the first and second members 3, 5 relative to the support 2.

The housing or support 2 may have any suitable configuration. In one embodiment, the support could comprise an upper part symmetrical to the lower part 2, or different to the lower part 2, the upper and lower parts together housing the mechanism 1. The housing may comprise seals and will hold lubricant for lubricating motion of the mechanism.

Figure 2:
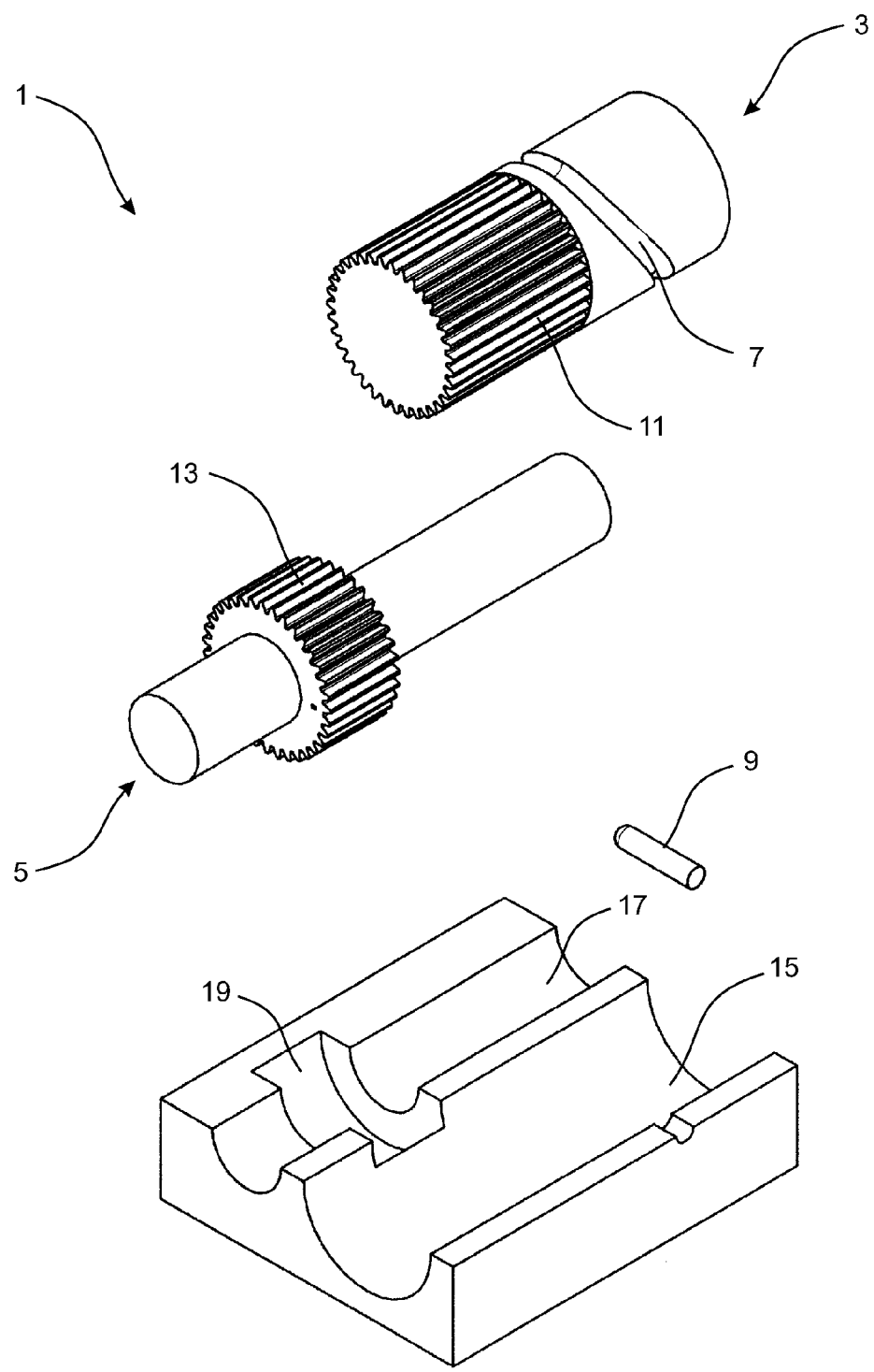
FIG. 2 is an exploded perspective view of the mechanism of FIG. 1.
Figure 3:
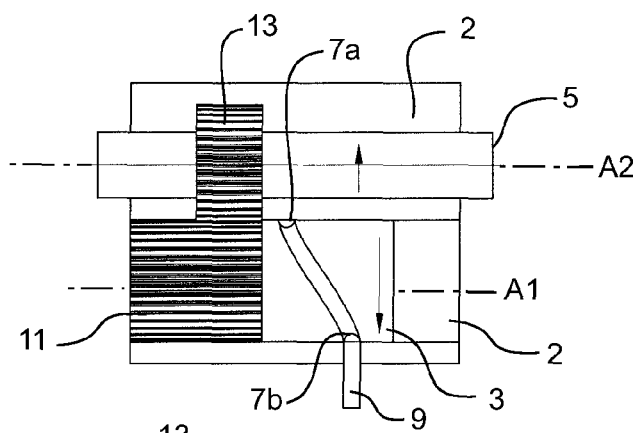
FIG. 3 is a plan view of the embodiment of FIGS. 1 and 2 showing the reciprocating-rotating member at a first end position and indicating the relative motion of the components of the mechanism.

FIGS. 3 to 6 illustrate the operation of the mechanism 1 of FIGS. 1 and 2. The arrows in FIGS. 3 to 6 indicate the movement of the first and second members 3, 5.

The mechanism 1 may be driven by rotation of the second member 5, or by applying axial force to the first member 3.

Figure 4:
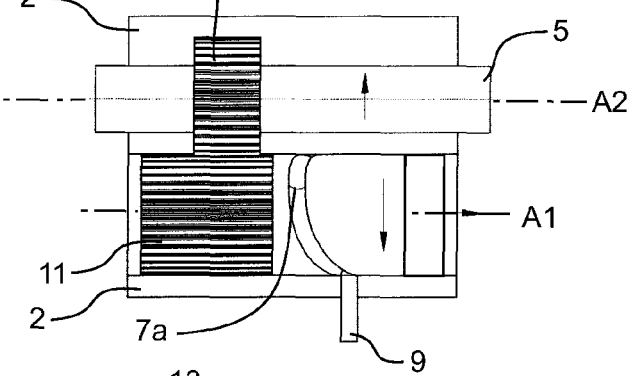
FIG. 4 is a plan view corresponding to FIG. 3, but showing the reciprocating-rotating member at a position intermediate its two end positions.
Figure 5:
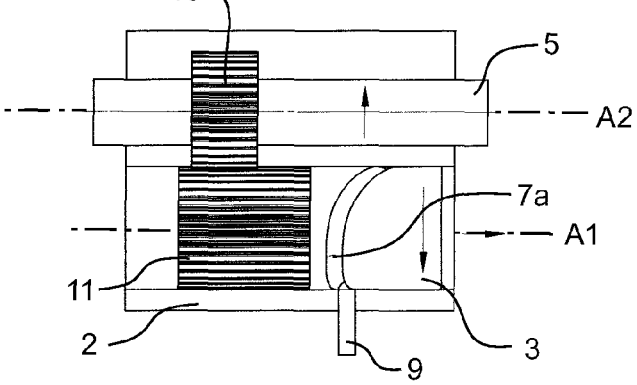
FIG. 5 is a plan view corresponding to FIGS. 3 and 4, but showing the reciprocating-rotating member at a further position intermediate its two end positions.

In the case where the mechanism 1 is driven by rotation of the second member 5, rotation of the second member 5, and thereby the second gear 13, turns the first gear 11, and thereby the first member 3, in the opposite direction. As the first member 3 rotates, the guide pin 7 on the support 2 slides in the slot 7 on the first member 3. The sinuous profile of the slot 7 causes the first member 3 to move along the first axis A1, relative to the support 2, as illustrated in FIGS. 4 and 5, to change the relative axial position of the first and second gears 11, 13.

Figure 6:
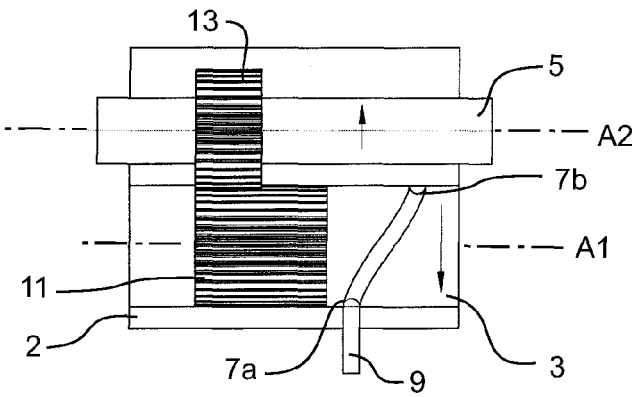
FIG. 6 is a plan view corresponding to FIGS. 3 to 5, but showing the reciprocating-rotating member at a second end position.

When the first member 3 is rotated to a position where the pin is located at the apex 7a of a lobe of the cam surface 7, as shown in FIG. 6, or at a minima 7b, further rotation of the first member 3 causes the direction of the linear movement of the first member to change to the opposite direction. This results in reciprocation of the first member 3 along the first axis A1. Rotation of the first member 3 is in the opposite direction to the driving motion of the second member 5.

In the case where the mechanism is driven by an alternating axial force applied to the first member 3, the axial force causes both linear and rotational motion of the first member 3. This occurs because the slot 7 constraining the motion of the first member 3 is non-perpendicular to the direction of the applied force. The angled nature of the slot causes the first member 3 to rotate as it moves along the first axis A1. The resulting rotation of the first member 3 is transmitted to the second member 5 by the first and second gears 11, 13.

In some applications a flywheel may be provided on or operatively connected to the first or second member 3, 5. The flywheel would provide increased rotational momentum to the first member 3 so the first member would continue to rotate when the pin 9 is located at the apex 7a of a lobe, as shown in FIG. 6, or at a minima 7b, where the slot is at perpendicular to the first axis A1 and where otherwise there could be 'dead spots'.

Figure 7:
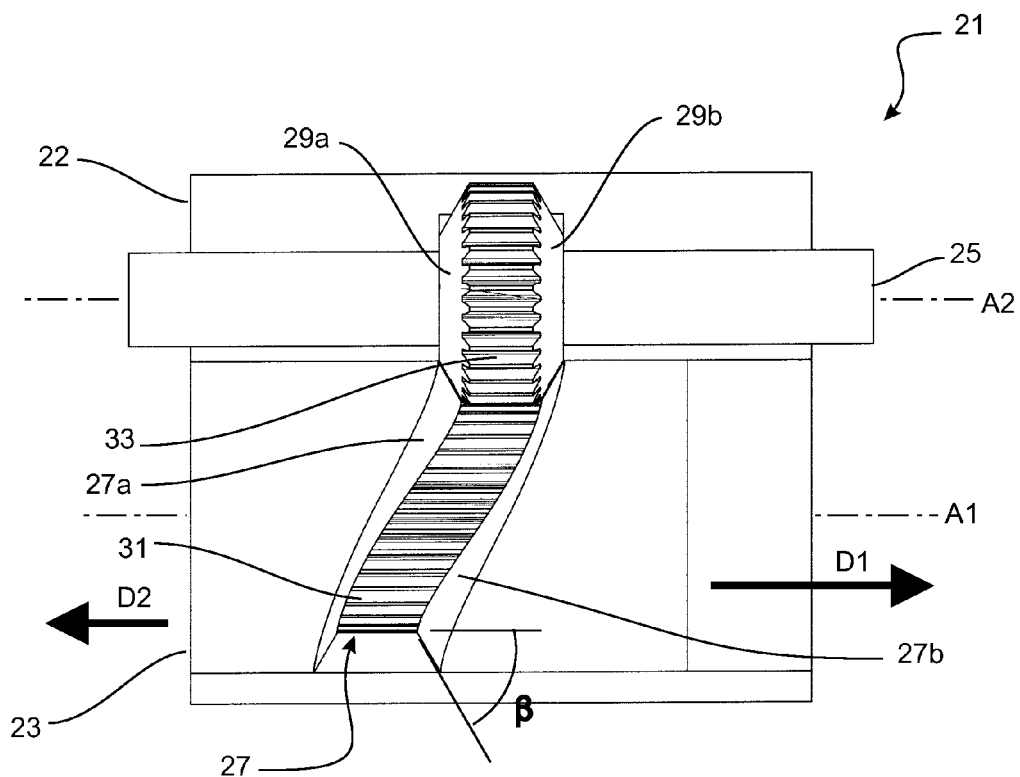
FIG. 7 is a plan view of a second exemplary embodiment mechanism according to the present invention.
Figure 8:
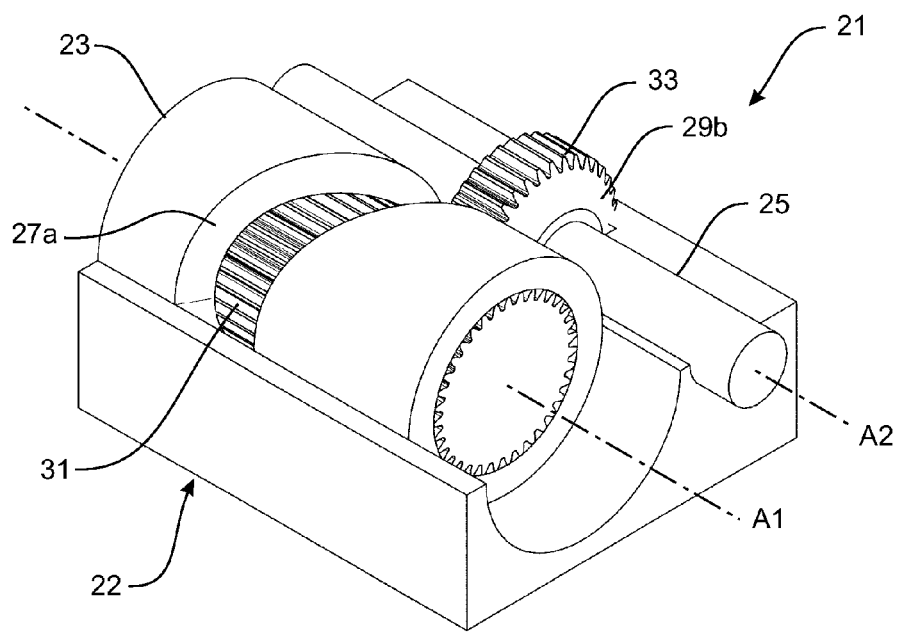
FIG. 8 is a perspective view of the embodiment shown in FIG. 7.

FIGS. 7 and 8 show a second exemplary embodiment mechanism 21. Unless described below, the features and functionality of this embodiment should be considered the same as for the first embodiment above, and like reference numbers indicate like parts with the addition of 20. In this embodiment, the guide is provided by surfaces 29a, 29b on the sides of the second gear 33. The second gear 33 is fixed to or integral with the second member 25 and rotatable with the second member relative to the support 22 but fixed relative to the support 22 in the axial direction.

The first gear 31 is recessed in a curved channel 27 on the first member 23. The sides 27a, 27b of the channel 27 form generally opposed cam surfaces configured to be in rolling contact with the guide surfaces 29a, 29b. Similar to the first embodiment, the channel in the embodiment shown comprises a single lobe, but may comprise two or more lobes.

The sides 27a, 27b of the channel and the guide surfaces 29a, 29b form an angle β of about 60 degrees to the first axis A1, enabling the respective surfaces to be in rolling contact with each other. The maximum angle of the channel sides 27a, 27b and guide surfaces 29a, 29b relative to the first axis A1 depends on the curvature of the cam surface in the axial direction, and may vary along the surface. For example, for a given diameter first member 23, a channel 27 with more lobes, or with lobes having a greater amplitude, the cam surface 27a, 27b will generally have a higher maximum curvature and, therefore, the angle of the channel sides 27a, 27b and guide surfaces 29a, 29b with the first axis A1 will need to be smaller to prevent the first and second members 23, 25 locking.

Preferably, the cam surface(s) 27a, 27b and/or the guide surface(s) 29a, 29b, or (where the surfaces are curved) a tangent of the cam and guide surface(s), are angled between about 45 and about 90 degrees to the first axis A1. This results in the guide or cam surfaces(s) on the support 22 or the first member 23 more efficiently reacting the axial load applied to the first member 23 or transfer an axial load to the first member than if the surfaces are at a smaller angle.

The mechanism 21 may be driven by rotation of the second member 25, or by applying axial force to the first member 23, depending on the application of the mechanism.

In the case where the mechanism 21 is driven by rotation of the second member 25, rotation of the second member 25 and thereby the second gear 33 turns the first gear 31 and thereby the first member 23 in the opposite direction to the second member 25. As the second gear 33 rotates, the guide surfaces 29a, 29b roll in the channel 27 against the channel side surfaces 27a, 27b. The profile of the channel 27 causes the first member 23 to move linearly relative to the support 22.

In a first part of the motion, the second gear 33 moves from a position in the channel 17 at a lobe apex toward a position at a minima. During this stage, a first one of the guide surfaces 29a transmits the axial force to the first member 23 and a first one of the channel surfaces 27a acts as the cam surface.

When the first member 23 is rotated to a position where the second gear 33 is positioned at a minima of the channel 27, the direction of the linear movement of the first member 23 changes to be in the opposite direction, causing reciprocation of the first member 23 along the first axis A1. In this second part of the motion with the second gear 33 between the minima and lobe apex, a second one of the guide surfaces 29b is transmitting the axial force to the first member 23 and a second one of the channel surfaces 27b acts as the cam surface.

Similarly, in the case where the mechanism is driven by an alternating axial force applied to the first member 23, the axial force causes both linear and rotational motion of the first member 23. When the axial force is applied in a first direction, the first channel surface 27a acts as the cam surface and the axial force is reacted against the first guide surface 29a. When the axial force is applied in a second opposite direction, the second channel surface 27b acts as the cam surface and the axial force is reacted against the second guide surface 29b.

The profile of the cam surface controls the amplitude, frequency, velocity, and acceleration of the reciprocation of the first member 3, 23 relative to rotation of the second member 5, 25. This enables reciprocation of the first member 3, 23 to be controlled and customized to a degree not possible with traditional mechanisms such as the slider-crank. For example, for a steeper cam surface profile, the velocity of reciprocation will be greater than for a flatter cam surface profile. The amplitude of the lobe(s) determines the amplitude of the reciprocation for the first member 3, 23, and the number of lobes on the cam surface determines the frequency of the reciprocation relative to the rotation of the second member 5, 25.

In some applications, it may be desirable to alter the amplitude of the reciprocation on subsequent strokes of the first member over a single rotation of the first or second member. This may be achieved with a cam surface having a plurality of lobes. For example, to alternate between a reciprocation with a short stroke length and a reciprocation with a longer stroke length, the cam surface could have two lobes, one lobe having a smaller amplitude than the other lobe. Similarly, the cam profile could be shaped to achieve quick return, a dwell at one, both, or between reciprocating limits, and/or varying acceleration of the reciprocation motion throughout the stroke.

In an alternative embodiment, the second gear 33 may be recessed in a curved channel on the second member 25, and the cam surface and first gear 31 may be provided on a continuous projection extending around the first member 23 that is in rolling contact with the channel on the second member 25. The sides of the channel in the second member 25 would form the guide surfaces, and the generally opposed surfaces on the projection would form the cam surfaces.

Figure 9:
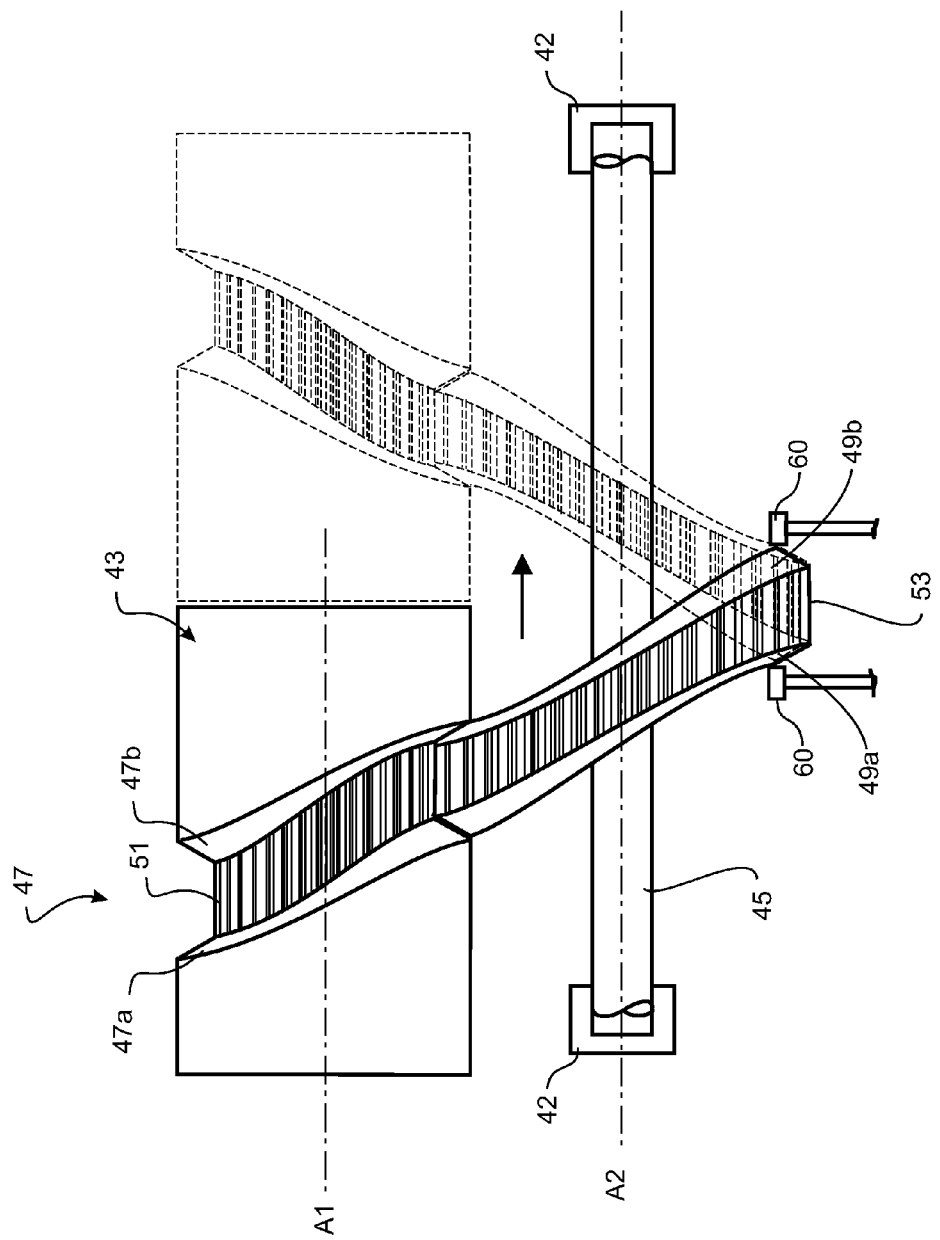
FIG. 9 is a perspective view of an alternative exemplary embodiment mechanism according to the present invention, having two reciprocating-rotating members.

FIG. 9 shows an alternative exemplary embodiment mechanism in which the second member 45 is able to reciprocate along axis A2 as well as rotate about the axis A2. However, the amplitude of the reciprocation of the second member 45 along axis A2 is less than the amplitude of reciprocation of the first member 43 along axis A1. Unless described below, the features and functionality of this embodiment is similar to the second embodiment described above, and like reference numbers indicate like parts with the addition of 20.

In the embodiment of FIG. 9, the first gear 51 is recessed in a curved channel 47 on the first member 43, forming the guide. The cam surface and second gear 53 is provided on a continuous curved projection extending around the second member 45 that is in rolling contact with the channel 47 on the first member 43. The sides of the channel 47a, 47b in the first member 43 form the guide surfaces, and the generally opposed surfaces 49a, 49b on the projection 49 form the cam surfaces. Alternatively, the first gear 51 may be provided on a continuous curved projection extending around the first member 43 and the second gear 53 may be recessed in a curved channel on the second member, forming a guide that is in rolling contact with the projection on the first member 43.

A second guide in the form of rollers 60, for example, is fixed relative to the housing or support 42 in the direction of the second axis A2. The guide 60 engages the cam surfaces 49a, 49b on the curved projection 49 of the second member 45. As the first member 43 reciprocates and rotates, the second member 45 rotates and also reciprocates due to the curved projection 49 being guided relative to the housing. Rather than being rollers, the second guide could comprise any other suitable guide feature, or may comprise a gear configured to engage the second gear 53.

Amongst other applications, the mechanisms 1, 21 of the present application may be utilised in hydraulic motors, for example, to convert linear motion of a piston in rotational motion, or in an engine for example, to convert linear motion of a piston in an engine to rotational motion of a flywheel and vice versa. Alternatively, the mechanisms 1, 21 may be utilized in compressors or pumps, for example, to convert rotary motion to linear reciprocating motion of a pump piston. The pistons may be operatively connected to the first member 3, 23 by a bearing to enable the first member 3, 23 to rotate relative to the piston. Alternatively the pistons may be fixed for rotation or integral with the first member 3, 23 such that the piston rotates within the cylinder (not shown).

The mechanism is suitable for use in a single cylinder arrangement, or with two opposed cylinders that apply axial force to the first member in alternating directions. In a single cylinder arrangement for example, movement of a piston in the cylinder towards the mechanism such as from combustion of a fuel in the cylinder would apply axial force to the first member 3, 23, and thereby drive rotation of the second member 5, 25 in a first part of the motion. Rotation of the second member 5, 25 due to inertia from a flywheel and/or the second member being driven by a further mechanism would then drive rotation and reciprocation of the first member 3, 23 and thereby the piston in the opposite direction. These arrangements could be used in internal combustion diesel or petrol engines, steam engines, or hydraulic pumps or motors, for example.

In a single-cylinder arrangement, the guide member 9, 29 may be adjustable, for example hydraulically, to alter the axial position of the guide member relative to the housing 2, 22. In an internal combustion engine, this feature could be used to alter the compression ratio of the cylinder.

In an opposed cylinder arrangement, one cylinder may be provided at each end of the first member 3, 23. In an internal combustion engine having this arrangement, when the piston in one cylinder is at its maximum stroke position, the piston in the other cylinder is at its minimum stroke position. Combustion of fuel in one cylinder would move the piston in that cylinder from the minimum stroke position to its maximum stroke position. That movement would cause the piston in the opposed cylinder to conversely move from its maximum stroke position to its minimum stroke position, compressing gasses in the cylinder. The process would then be repeated but being initiated from the opposed cylinder causing reciprocation of the first member 3, 23.

Figure 10:
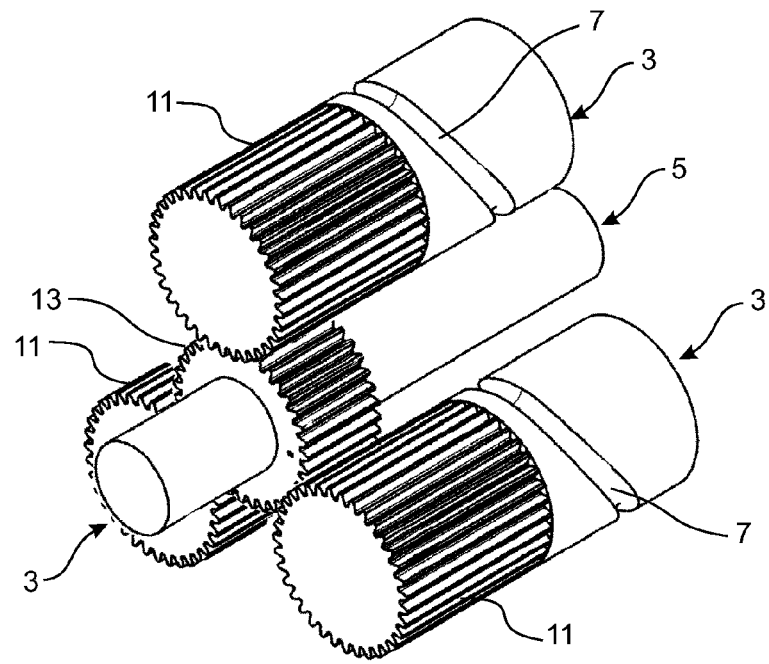
FIG. 10 is a perspective view of an exemplary embodiment arrangement having multiple reciprocating-rotating members arranged about the rotating member.

Embodiments of the mechanism may comprise a plurality or first members 3, 23 or second members 5, 25. One arrangement, shown in FIG. 10, may comprise a single rotational output member corresponding to the second member 5, 25 of the present mechanism. Several first members 3, 23 each driven by a single cylinder may be arranged around the output member to drive (or be driven by) rotation of the output member. There may be two, three, four, or any number of first members 3, 23 arranged around the second member 5, 25. The first members may be provided in a balanced arrangement around the second member 5, 25. In the embodiment shown, a guide member (not shown) is fixed relative to the housing (also not shown) and engages the slot 7 on the second member 5, 25.

Figure 11:
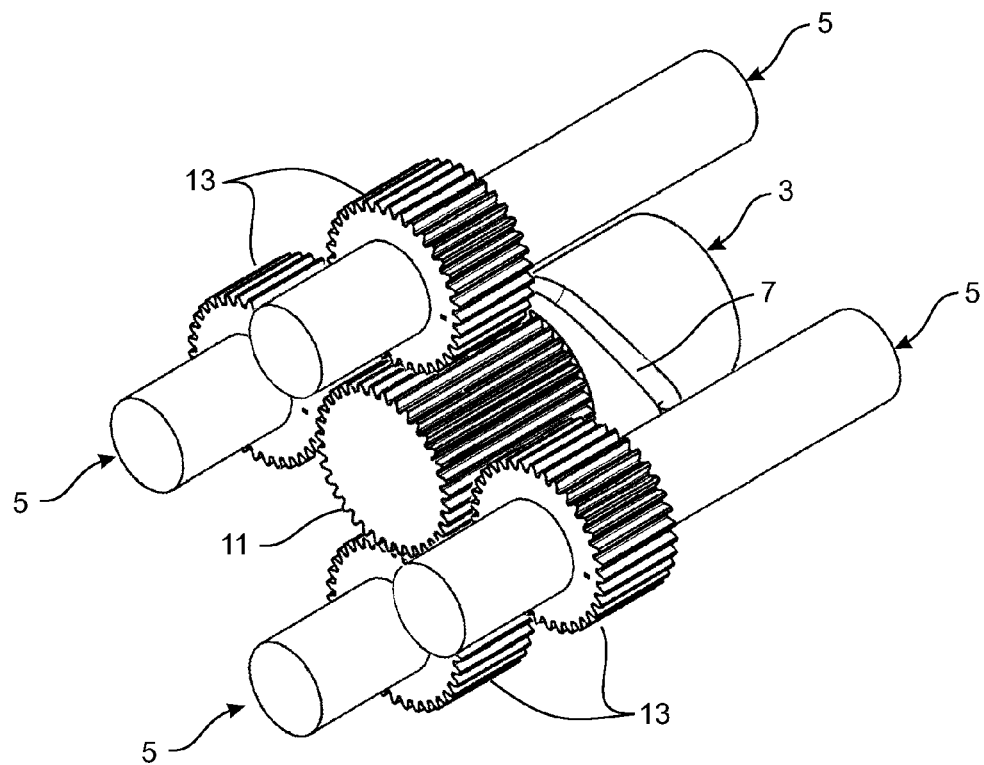
FIG. 11 is a perspective view of an exemplary embodiment arrangement having multiple rotating members arranged about the reciprocating-rotating member.

One arrangement, shown in FIG. 11, may comprise a single rotational and reciprocable member corresponding to the first member 3, 23 of the present mechanism, operatively connected to two opposed cylinders. Several rotating second members 5, 25 may be arranged around the first member and driven by (or may drive) the single first member 3, 23. There may be two, three, four, or any number of second members 5, 25 arranged around the first member 3, 23. The second members 5, 25 may be provided in a balanced arrangement around the first member 3, 23. In the embodiment shown, the slot 7 on each reciprocating member 5, 25 engages a respective a guide member (not shown) that is fixed relative to the housing (not shown).

Due to the small number of parts in the mechanism of the present invention, the mechanism is generally lighter and more compact than traditional mechanisms for converting between reciprocating and rotating motion. In addition, the ability for various gear ratios between the first and second members may reduce the need to have a separate gear reduction box, further saving on space and weight. The mechanism can be designed to be much stronger than conventional mechanisms of a similar size. This increased strength makes faster reciprocation of the first members possible.

Preferred embodiments of the invention have been described by way of example only and modifications may be made thereto without departing from the scope of the invention as defined by the accompanying claims.

For example, in the exemplary embodiments described, two generally opposed cam surfaces are provided by facing surfaces in a channel or slot. In an alternative embodiment the first member 3, 23 could instead comprise a projection with generally opposed cam surfaces provided on opposite sides of the projection, and facing complementary guide surfaces provided on the support or the second member 5, 25.

Alternatively, the mechanism may comprise only a single cam surface, and the second member may be axially biased, such that movement of the first member 3, 23 in one direction is driven by an externally applied axial force or force applied by the second member 5, 25, and movement in the opposite direction is effected by a biasing member such as a spring.

What I claim is:

1. A mechanism for converting rotating motion to rotating and reciprocating motion and/or for converting rotating and reciprocating motion to rotating motion, the mechanism comprising:
    a housing or support;
    a first member rotatable relative to the housing or support about a first axis and reciprocable along the first axis relative to the housing or support; and
    a second member rotatable relative to the housing or support about a second axis that is spaced from the first axis, the second member operatively coupled to the first member such that rotation of one of the members causes rotation of the other of the members;
    wherein the first member comprises a groove or channel and surfaces defining said groove or channel provide two generally opposed cam surfaces; and the second member comprises a projection and sides of said projection provide two generally opposed guide surfaces configured to be in rolling contact with the cam surfaces, said guide surfaces being coaxial with the second member;
  wherein the groove or channel comprises gear teeth between the cam surfaces, forming a first gear, and the projection on the second member comprises gear teeth forming a second gear configured to engage the first gear; and
  wherein the cam surfaces and the guide surfaces are configured to cause the first member to rotate upon movement of the first member along the first axis, and/or to cause the first member to move along the first axis upon rotation of the first member.

2. A mechanism as claimed in claim 1, wherein each cam surface has a cam profile comprising at least one lobe.

3. A mechanism as claimed in claim 1, wherein the cam surfaces are arranged to support a load applied in a direction substantially parallel to the first axis.

4. A mechanism as claimed in claim 1, wherein each cam surface, or a tangent of each cam surface, forms an angle of between about 30 and about 90 degrees relative to the first axis.

5. A mechanism as claimed in claim 1, wherein the first and second gears are spur gears.

6. A mechanism as claimed in claim 1, wherein the cam surfaces are intermediate a first end and an opposite second end of the first member.

7. A mechanism as claimed in claim 1, wherein the first and second members are parallel.

8. A mechanism as claimed in claim 1, wherein the first and second members are cylindrical.

9. A mechanism as claimed in claim 1, comprising at least one further first member coupled to the second member such that rotation of the first members or the second member causes rotation of the other of the first members or the second member.

10. A mechanism as claimed in claim 1, comprising at least one further second member coupled to the first member such that rotation of the first member or the second members causes rotation of the other of the first member or the second members.

11. A mechanism as claimed in claim 1 configured to convert rotating motion of the or each second member to rotating and reciprocating motion of the or each first member.

12. A mechanism as claimed in claim 1 configured to convert rotating and reciprocating motion of the or each first member to rotating motion of the or each second member.

13. A mechanism as claimed in claim 1, configured to both convert rotating motion of the or each second member to rotating and reciprocating motion of the or each first member, and rotating and reciprocating motion of the or each first member to rotating motion of the or each second member.

14. A mechanism as claimed in claim 1, wherein the guide surfaces are fixed relative to the projection.

\* \* \* \* \*